United States Patent [19]
Hareng et al.

[11] 3,988,056
[45] Oct. 26, 1976

[54] LIQUID-CRYSTAL DISPLAY METHOD AND INFORMATION-PROCESSING APPARATUS APPLYING THIS METHOD

[75] Inventors: Michel Hareng; Serge Le Berre, both of Paris, France

[73] Assignee: Thomson-CSF, Paris, France

[22] Filed: Nov. 18, 1975

[21] Appl. No.: 632,954

[30] Foreign Application Priority Data
Nov. 21, 1975 France .............................. 75.38284

[52] U.S. Cl.......................... 350/160 LC; 343/6 ND
[51] Int. Cl.² ............................................ G02F 1/13
[58] Field of Search ............ 350/160 LC; 343/6 ND

[56] References Cited
UNITED STATES PATENTS

| | | | |
|---|---|---|---|
| 3,775,757 | 11/1973 | Taylor et al. ............. | 350/160 LC X |
| 3,796,999 | 3/1974 | Kahn ......................... | 350/160 LC X |
| 3,836,243 | 9/1974 | Melchior ................... | 350/160 LC X |

Primary Examiner—Edward S. Bauer
Attorney, Agent, or Firm—Cushman, Darby & Cushman

[57] ABSTRACT

The invention concerns liquid-crystal display methods and their application to radar screens. The invention provides a method which consists in thermally writing on a layer of liquid-crystal two successive patterns which are combined in accordance with a law designated A × B̄ in Boolean algebra by the way of a reorienting biasing voltage applied during the writing in of the second of said pattern.

7 Claims, 3 Drawing Figures

LIQUID-CRYSTAL DISPLAY METHOD AND INFORMATION-PROCESSING APPARATUS APPLYING THIS METHOD

The present invention relates to liquid-crystal display methods, and it also concerns the application of these methods to information-processing apparatus, to methods of eliminating fixed echoes in radars and to radar screens.

It is known to record a pattern by utilising the thermo-optical effect in liquid-crystals in the smectic phase. For this purpose, a thin layer of such a crystal is disposed between two transparent solid wafers coated with a product which favours the orientation of this crystal, and the cell thus formed is brought to a temperature at which the crystal is in the smectic phase. The layer is then transparent. For writing the pattern, the layer is scanned by a radiant energy beam which supplies heat. This beam is advantageously supplied by an infra-red laser. The intensity of the said beam is varied by means of an electro-optical modulator controlled by the video signal representing the pattern to be written. At the points where the heat supplied by the beam is sufficient to bring the crystal from the smectic phase to the liquid phase, the said crystal cools too rapidly, after the passage of the beam, to resume an ordered structure when it returns to the smectic phase and it then becomes highly diffusing at these points. The pattern is thus recorded in the layer in the form of variations of its diffusing power and it can be projected by an appropriate optical system and an appropriate light source on to a screen, which is generally necessary by reason of the small dimensions of the cell, which are necessary because of the low thermal inertial required in order to ensure a sufficiently high writing speed.

It is also known to record such a pattern by scanning the layer of the previously described cell by means of a radiant energy beam of constant intensity and applying across the said layer a biasing voltage which varies as a function of the video signal, the said voltage being applied between two transparent electrodes deposited on the wafers between which the layer is sandwiched. When the crystal passes back from the liquid phase to the smectic phase after the passage of the beam, it becomes reoriented if the voltage applied thereto at this instant is sufficiently high. We will take the following usual conventions:

an increase of the video signal corresponds to an increase of the diffusing power of the pattern and is called writing, a zero video signal corresponding to absence of writing an increase in the light transmitted by the electro-optical modulator and an increase in the voltage applied to the cell, both of which correspond to an increase of the video signal, are called positive modulations of the radiant energy beam and of the voltage. The inverse correspondences are called negative modulations.

In accordance with these conventions, for writing a pattern, it is necessary to modulate the radiant energy beam positively in the first writing method and to modulate the voltage negatively in the second writing method.

The patterns thus inscribed on the layer can be erased either by uniformly heatingg the layer until it passes into the liquid phase and allowing it to cool slowly, or by applying a sufficiently high voltage, which is distinctly higher than that used in the second writing method.

It is possible to erase a portion of the pattern selectively by rescanning this portion of the pattern with the radiant energy beam, while applying the voltage employed in the second writing method and withoout modulating this voltage. Those portions of the pattern which are subjected to the action of the beam then again become non-diffusing, because they are reoriented by the voltage when they cool.

In accordance with the present invention it is provided a method for displaying a radiant energy pattern corresponding to a logical combination of two original patterns, each of said original patterns being produced in accordance with two distinct incoming electrical signals, said method comprising in the following order the steps of:

thermally writing in one of said original patterns onto a layer of smectic liquid-crystal under the control of one of said electrical signals;

thermally writing in the other of said original patterns onto said layer under the simultaneous control of the other of said electrical signals and of a reorienting biasing voltage applied across said layer;

and supplying to said layer a read-out radiation for reading out said radiant energy pattern.

For a better understanding of the invention, and to show how the same may be carried into effect, reference will be made to the ensuing description and to the attached figures among which:

Figure 1:
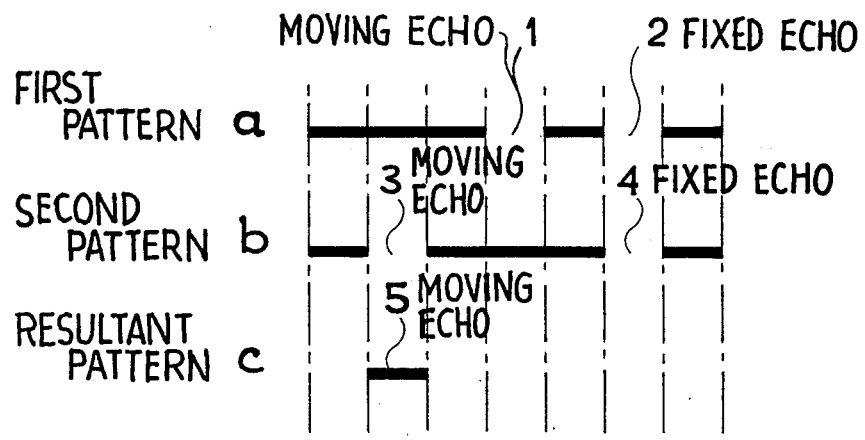
FIG. 1 illustrates the three consecutive states of an isolated line on a display device applying a method according to the invention.

In FIG. 1 an isolated line on a display device according to the invention is shown, the thickly drawn strokes representing the non-reoriented and therefore diffusing crystal. $a$ is this line after the writing of the first pattern by using one of the two methods described herein above, $b$ is this line as it would be if the second pattern were written in the same way on the device bearing no writing, and $c$ is this line as it would appear after the writing of the second pattern in the presence of the appropriate voltage and on the device on which the first pattern has already been written. Let the presence of the stroke in the image by represented by 1 and the absence of this stroke by 0; let A be the parameter representing the content of the line $a$ at each point of the said line (A takes at each point of the line $a$ the value 1 or 0 depending upon whether the stroke exists there or not) and let B likewise be defined for the line $b$ and C for the line $c$. The truth table of the parameter C is given by:

| B | A | 1 | 0 |
|---|---|---|---|
| 1 |   | 0 | 0 |
| 0 |   | 1 | 0 | which thus corresponds to the Boolean operation $C = A \times \bar{B}$.

An application of this display device is its use as a radar screen with elimination of fixed echoes. Let us take, for example, a video signal which represents a radar image and the echoes of which are assumed, as usual, to be represented by increases of the said signal for giving illuminated areas in the final displayed image. Let us write a first image obtained after a first sweep of the radar antenna, using a negative modulation as defined in the foregoing. This image will be represented, if read alone, in FIG. 1 by the line $a$ in which the echoes will appear in the form of stroke absences 1 and 2. Let us write a second image obtained after a second sweep of the antenna, also with a negative modulation and applying the aforesaid reorienting biasing voltage. This image will be represented, if read alone, by the line $b$, in which the echoes will appear in the form of stroke absences 3 and 4. The image resulting from these two successive writings will be represented in FIG. 1 by the line $c$. There only remains in this line $c$ the stroke 5, which represents, this time in positive modulation, the moving echo 1 which is shifted to 3. The fixed echo 2, which has remained at the same location of the image at 4, has disappeared. It is then possible to project the definitive image on to a screen on which echoes appear as illuminated areas in order to display it. For continuing the utilisation of the radar, it is then necessary for the pattern on the device to be erased entirely by a method known per se, as one of those described herein above, whereafter the operations can recommence. The image may be retained on the projection screen if it is desired to avoid interruption in the display, for example by using a screen having a fluorescence whose afterglow is adapted to the scanning speed of the radar.

Figure 2:
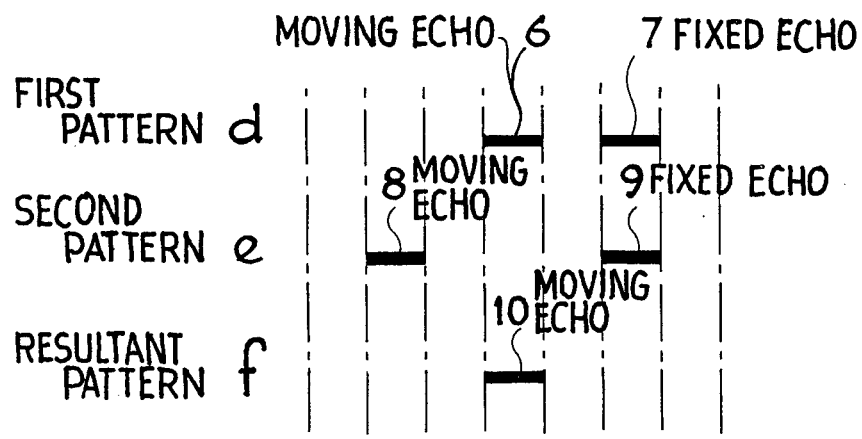
FIG. 2 illustrates the same three consecutive states while using an other type of modulation.

If it is desired to use a positive modulation for writing the first and second radar images, there is obtained the process illustrated in FIG. 2, in which the line $d$ represents the first pattern, the line $e$ the second pattern and the line $f$ the resultant pattern. The moving echo is situated at 6, 8 and 10 and the fixed echo at 7 and 9. It will be seen that the fixed echo is thus also eliminated, but that, in contrast thereto, the moving echo has remained in the position which it occupied in the first image, which thus constitutes a delay in the display corresponding to the duration of one complete sweep of the antenna.

Figure 3:
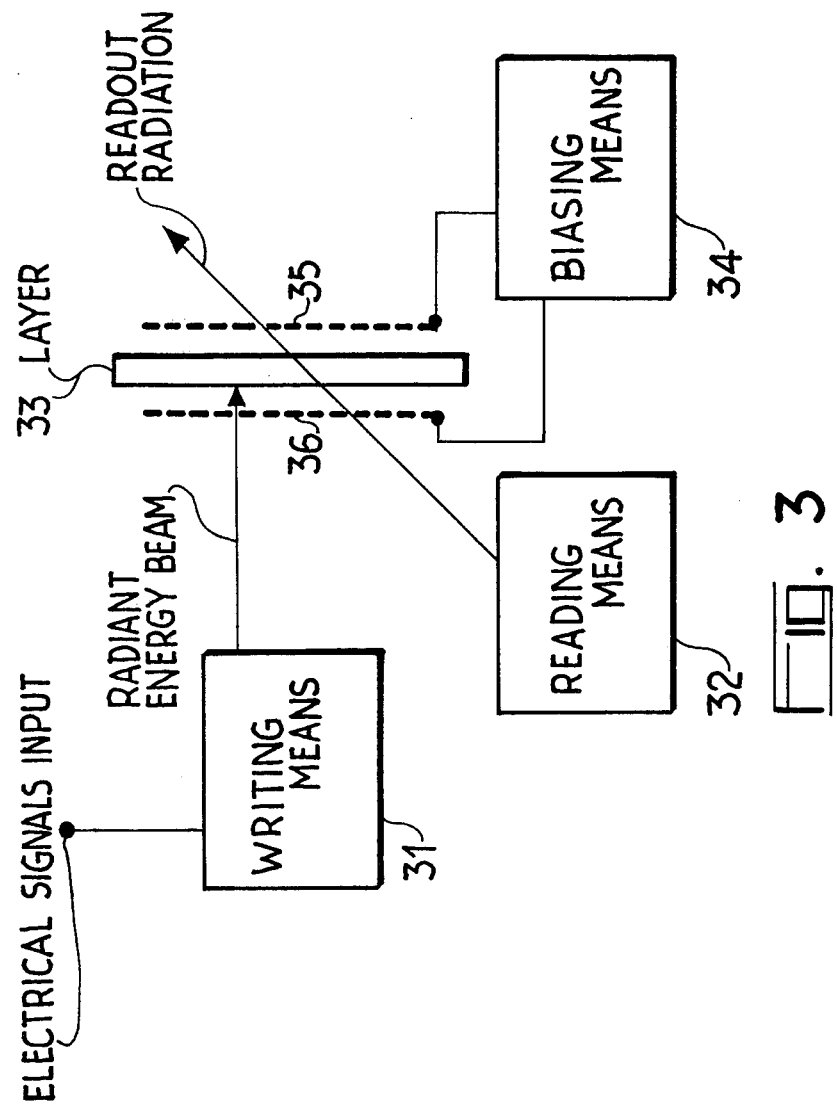
FIG. 3 illustrates the diagram of an apparatus applying a method according to the invention.

In FIG. 3, the diagram of an apparatus applying a method according to the invention is shown. A radiant energy beam supplied by writing means 31 scans a layer 33 of smectic liquid-crystal. Electrical signals representing patterns to be written are applied on an input of these writing means. Biasing means 34 apply across said layer during writing in of second pattern said reorienting biasing voltage by the way of two transparent electrodes 36 and 35. After the writing in of said second pattern read-out means 32 supply to said layer a read-out radiation.

What is claimed is:
1. A method for displaying a radiant energy pattern corresponding to a logical combination of two original patterns, each of said original patterns being produced in accordance with two distinct incoming electrical signals, said method comprising in the following order the steps of:
   thermally writing in one of said original patterns onto a layer of smectic liquid-crystal under the control of one of said electrical signals;
   thermally writing in the other of said original patterns onto said layer under the simultaneous control of the other of said electrical signals and of a reorienting biasing voltage applied across said layer;
   and supplying to said layer a read-out radiation for reading out said radiant energy pattern.

2. A method as claimed in claim 1, wherein said two electrical signals are successively applied to modulator means controlling the intensity of a radiant energy beam for performing said thermally writing in of said two original patterns; said radiant energy beam scanning said layer, and said reorienting biasing voltage having a constant value and being applied across said layer only during the second of said steps.

3. A method as claimed in claim 1, wherein a radiant energy beam is scanning said layer, and said reorienting biasing voltage is simultaneously applied across said layer, for performing successively said thermally writing in of said two original patterns; the intensity of said beam being constant during the first of said steps, and the value of said voltage being constant during the second of said steps; the one of said electrical signals being applied to means for controlling the value of said voltage during said first step, and the other of said electrical signals being applied to modulator means controlling the intensity of said beam during said second steps.

4. A method as claimed in claim 1, wherein said thermally writing in of said two original patterns are performed by using modulation processes giving images that, if read alone, give two patterns A and B having the same appearance as respectively said two original patterns; wherebby said radiant energy pattern is a logical combination of said patterns A and B, said logical combination being represented by a Booleau function $A \times \overline{B}$.

5. A method as claimed in claim 1, for displaying in a radar system a cancelled fixed echoes radar image, said two original patterns corresponding respectively to two consecutive original radar images in a sequence of radar images produced by said radar system, said radar images containing illuminated areas representing moving and fixed echoes, wherein said thermally writing in of said original patterns are performed by using modulation processes giving written images that, if read alone, contain dark areas representing said moving and fixed echoes; whereby said radiant energy pattern represents the second of said two original radar images without said fixed echoes and with illuminated areas corresponding to said moving echoes.

6. A method as claimed in claim 1, for displaying in a radar system a cancelled fixed echoes radar image, said two original patterns corresponding respectively to two consecutive original radar images in a sequence of radar images produced by said radar system, said radar images containing illuminated areas representing moving and fixed echoes, wherein said thermally writing in of said original patterns are performed by using modulation processes giving written images that, if read alone, contain illuminated areas representing said moving and fixed echoes; whereby said radiant energy pattern represents the first of said two original radar images without said fixed echoes and with illuminated areas corresponding to said moving echoes.

7. An apparatus for displaying a radiant energy pattern corresponding to a logical combination of two original patterns, each of said original patterns being produced in accordance with two distinct incoming electrical signals, said apparatus comprising: a layer of smectic liquid-crystal, writing means for thermally writing in successively each of said original patterns onto said layer, means for applying a reorienting biasing voltage across said layer during the writing in of the second of said original patterns, and means for supplying to said layer a read-out radiation for reading out said radiant energy pattern; said writing means having at least one input for said electrical signals.

* * * * *

UNITED STATES PATENT OFFICE
CERTIFICATE OF CORRECTION

Patent No. 3,988,056    Dated October 26, 1976

Inventor(s) Michel Hareng et al.

It is certified that error appears in the above-identified patent and that said Letters Patent are hereby corrected as shown below:

The Foreign Application Priority Data should read as follows:

--Nov. 21, 1974 France....................74.38284 --

Signed and Sealed this

Fourth Day of January 1977

[SEAL]

Attest:

RUTH C. MASON
Attesting Officer

C. MARSHALL DANN
Commissioner of Patents and Trademarks